Patented Feb. 26, 1929.

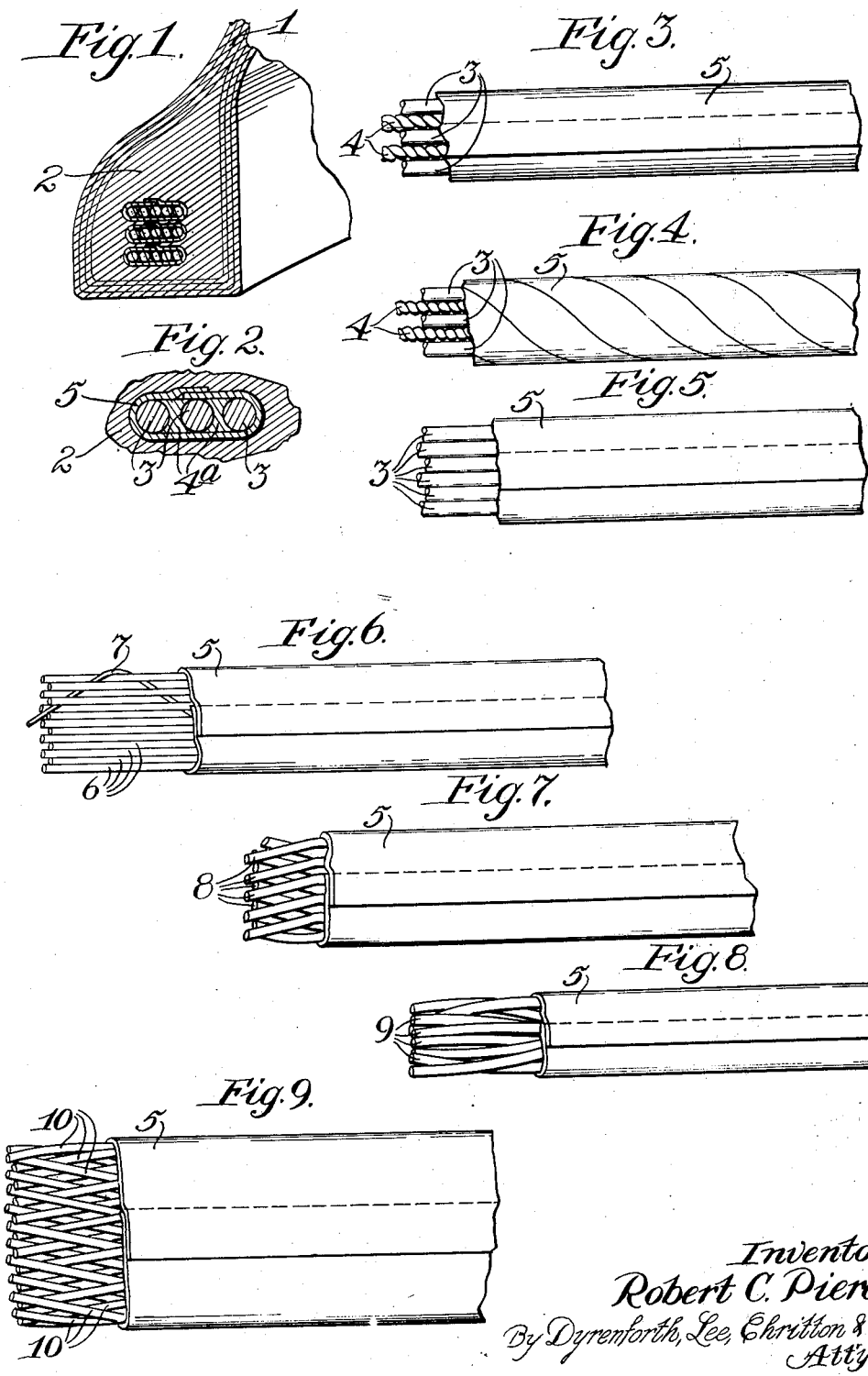

1,703,593

UNITED STATES PATENT OFFICE.

ROBERT C. PIERCE, OF NILES, MICHIGAN, ASSIGNOR TO NATIONAL STANDARD COMPANY, A CORPORATION OF MICHIGAN.

TIRE-BEAD-REENFORCING ELEMENT.

Application filed February 21, 1927. Serial No. 169,975.

This invention relates to improvements in tire-bead reenforcing elements, and more especially such an element adapted to be put in the bead of a pneumatic tire casing.

Among the features of my invention is the provision of such a reenforcing element in which the tension members, such as, for example, wires, are arranged in substantially parallel relation so that the element will have tensile strength and very little, if any, stretch. The reenforcing element is also so constructed that it may be conformed or folded longitudinally without placing undue stress upon the individual strands or tension members.

The element is so made that it may be stored, handled, and shipped as a separate article of manufacture and may be convolutely disposed in a tire bead in the manufacture of the same and become substantially a part of the bead in the vulcanizing or curing process.

Other features and advantages of my invention will appear more fully as I proceed with my specification.

In that form of device embodying the features of my invention, shown in the accompanying drawings, Fig. 1 is a sectional perspective view of a portion of a tire showing the bead thereof, Fig. 2 is an enlarged sectional view of my improved reenforcing element showing the same in place in the bead of a tire, Fig. 3 is a top plan view of the element showing the same before it is incorporated in the bead of a tire, and Figs. 4 to 9 inclusive, are all views similar to Fig. 3 showing modified forms.

As shown in the drawings, 1 indicates a conventional tire casing provided with the usual bead 2, which is formed of a suitable rubber composition, the bead being of a cross-section corresponding to the tire in which it is desired to use the same.

Embedded in the bead proper 2 is a reenforcement, or reenforcing element, shown removed from the tire in Fig. 3. This reenforcing element is made up of alternate strands of wire 3 and cords or strings 4. As here shown, I have provided three wires and two cords lying in a plane.

The wires 3 are the tension members that give the element its tensile strength and it will be seen that they are arranged in parallel relation, thus giving the element the greatest amount of tensile strength for the material used and making it substantially non-stretchable. The strings or cords 4 lying between the wires are preferably impregnated with rubber compound and thus act as carriers of this material; so that when the element is in place in the bead, in the curing process, the rubber compound carried by the strings or cords 4 to a certain extent comes out of the strings and partially surrounds the wires 3. This action is assisted by the pressure to which the element is exposed in the making of the bead. In Fig. 2 I have attempted to illustrate this action of the rubber compound in leaving the cords 4 and partially surrounding the wires 3, by showing the element in cross-section on an enlarged scale embedded in the bead 2; and it will be seen that the rubber compound as indicated by 4ª which was carried by the cords 4, has partially surrounded the wires.

In order to hold the wires and cords in their parallel relation and make the reenforcing element self-sustaining so that it can be handled, stored, and shipped, I incase the wires and cords in a covering of suitable material indicated by 5. This covering is preferably formed of a fibrous material and may be a woven fibrous material, such as a losely woven cloth. The covering 5 is preferably also impregnated with rubber compound so that when the element is embedded in the bead as shown in Fig. 2, in the curing process, the rubber compound carried by the cover 5 and that carried by the strings 4 will unite together and both will unite with the rubber compound 2 of the bead to form a substantially unitary structure and firmly embed and lock the element in the bead. In the event that the covering 5 is not impregnated with rubber, the rubber compound carried by the cords or strings 4, will unite with the rubber compound of which the bead 2 is composed during the curing process. This action will be assisted by the pressure to which the element is exposed in forming the bead; and the rubber compound from the bead 2 and that from the strings 4 will be able to pass through the interstices of the fibrous covering 5 to assist in such uniting process.

In forming the element shown in Fig. 3 the wires 3 may or may not be previously coated with rubber compound.

In order to incase the wires and cords I preferably procure a long strip of the covering material 5 and wrap it about the same in one long fold or wrap as shown in Figs. 1, 2, and 3. In Fig. 4, however, I have shown a modified form in which the covering 5 is spirally wrapped or wound about the wires and cords.

In Fig. 5 I have shown a modified form of element similar to that shown in Fig. 3 except that the cords or strings 4 are omitted, the same being replaced by additional wires 3. In this form I have shown six wires 3; but it is to be understood that fewer or more may be used as desired. Likewise in the form shown in Fig. 3, fewer or more wires or cords as desired may be used.

In Fig. 6 I have shown another modified form of device in which I provide thirteen parallel wires 6, and also an additional wire or strand 7 woven diagonally back and forth. All these wires are incased in a covering 5 the same as in the other forms.

In Fig. 7 I have shown another modified form in which there is a plurality of strands 8 of resilient wire braided together with adjacent strands alternately and successively looped together with the corresponding reaches of their loops in crossed superimposed contact relation and with their bights contacting from edge to edge of the element, the resiliency of the wires tending to maintain the parts in such contacting engagement. These wires in turn are incased in a covering 5 the same as in the other forms.

In the device shown in Fig. 8 the wires 9 are bonded together by successively and alternately disposed coengaging loops with the reaches of corresponding loops disposed in superimposed crossed relation, the strands thus bonded being spirally twisted to a cable-like form. This resulting cable-like structure is likewise incased in a covering 5 similar to the others.

In the device shown in Fig. 9, the wires 10 are braided in a well-known manner to form a flat tape or ribbon, and this in turn is incased in a covering 5 as the others are.

In the forms shown in Figs. 3, 4, and 5, the covering of fibrous material holds the tension members in position and forms a reenforcing element that can be handled, stored, and transported.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim is new, and desire to secure by Letters Patent, is:

1. A tire bead reenforcing element consisting of a tension member and a rubber-compound carrying cord parallel to each other.

2. A tire bead reenforcing element consisting of a plurality of tension members and rubber-compound carrying cords parallel to each other.

3. A tire-bead reenforcing element consisting of a tension member and a rubber-compound carrying member parallel to each other, both of said members being encased in fibrous material.

4. A tire-bead reenforcing element consisting of a plurality of tension members and rubber-compound carrying members parallel to each other, all of said members being encased in fibrous material.

5. A tire-bead reenforcing element consisting of a tension member and a rubber-compound carrying member parallel to each other, both of said members being encased in fibrous material, said fibrous material constituting the sole means for holding said members in parallel relation.

6. A tire-bead reenforcing element consisting of a plurality of tension members and rubber-compound carrying members parallel to each other, all of said members being encased in fibrous material, said fibrous material constituting the sole means for holding said members in parallel relation.

In witness whereof, I have hereunto set my hand this 18th day of February, A. D. 1927.

ROBERT C. PIERCE.